United States Patent

[11] 3,599,517

| | | | | |
|---|---|---|---|---|
| [72] | Inventor | Johann Muller<br>Unterhaching, Germany | | |
| [21] | Appl. No. | 822,953 | | |
| [22] | Filed | May 8, 1969 | | |
| [45] | Patented | Aug. 17, 1971 | | |
| [73] | Assignee | Friedrich Deckel Praezisions Mechanik und Maschinenbau<br>Munich, Germany | | |
| [32] | Priority | May 13, 1968, Feb. 7, 1969 | | |
| [33] | | Austria | | |
| [31] | | A 4590/68 and A 1290/69 | | |

[54] BORING AND FACING HEAD FOR MACHINE TOOLS
10 Claims, 8 Drawing Figs.

[52] U.S. Cl............................................... 82/2 E,
77/58 H, 77/34.5
[51] Int. Cl....................................................... B23b 5/00
[50] Field of Search............................................ 82/2, 2.6,
34.4; 77/58.35, 34.5

[56] References Cited
UNITED STATES PATENTS

| | | | |
|---|---|---|---|
| 2,069,296 | 2/1937 | Woytych.................... | 77/58.35 |
| 2,404,433 | 7/1946 | Christman.................. | 82/2 (.6) |
| 2,648,237 | 8/1953 | Falconi...................... | 82/34.4 X |
| 3,232,143 | 2/1966 | Schurger et al............. | 82/34.4 X |
| 3,311,003 | 3/1967 | Daugherty.................. | 82/2 (.6) |

FOREIGN PATENTS

| | | | |
|---|---|---|---|
| 574,316 | 3/1958 | Italy........................... | 82/2 (.1) |

*Primary Examiner*—Leonidas Vlachos
*Attorneys*—Charles Shepard and Stonebraker and Shepard ABSTRACT: A boring and facing head for machine tools, in which the tool slide is radially displaceable on a rotating carrier. For radial adjustment of the tool slide, the slide is provided with a rack engaged by a gear mounted on and rotating with the slide carrier, the gear being turned for adjustment purposes by a nonrotating adjusting member extending along the axis of rotation of the carrier and projecting out the back of the housing, the projecting end of the adjusting member being provided with a scale which can be read while the carrier is rotating. The rotating carrier is driven by a shaft parallel to but offset radially from the axis of rotation. In one form of the invention, gauging stops are provided on a turret, for cooperation with a dial gauge or an end gauge, in order to determine accurately the position of the axially movable adjusting member which serves to adjust the radial position of the tool slide on the rotating slide carrier.

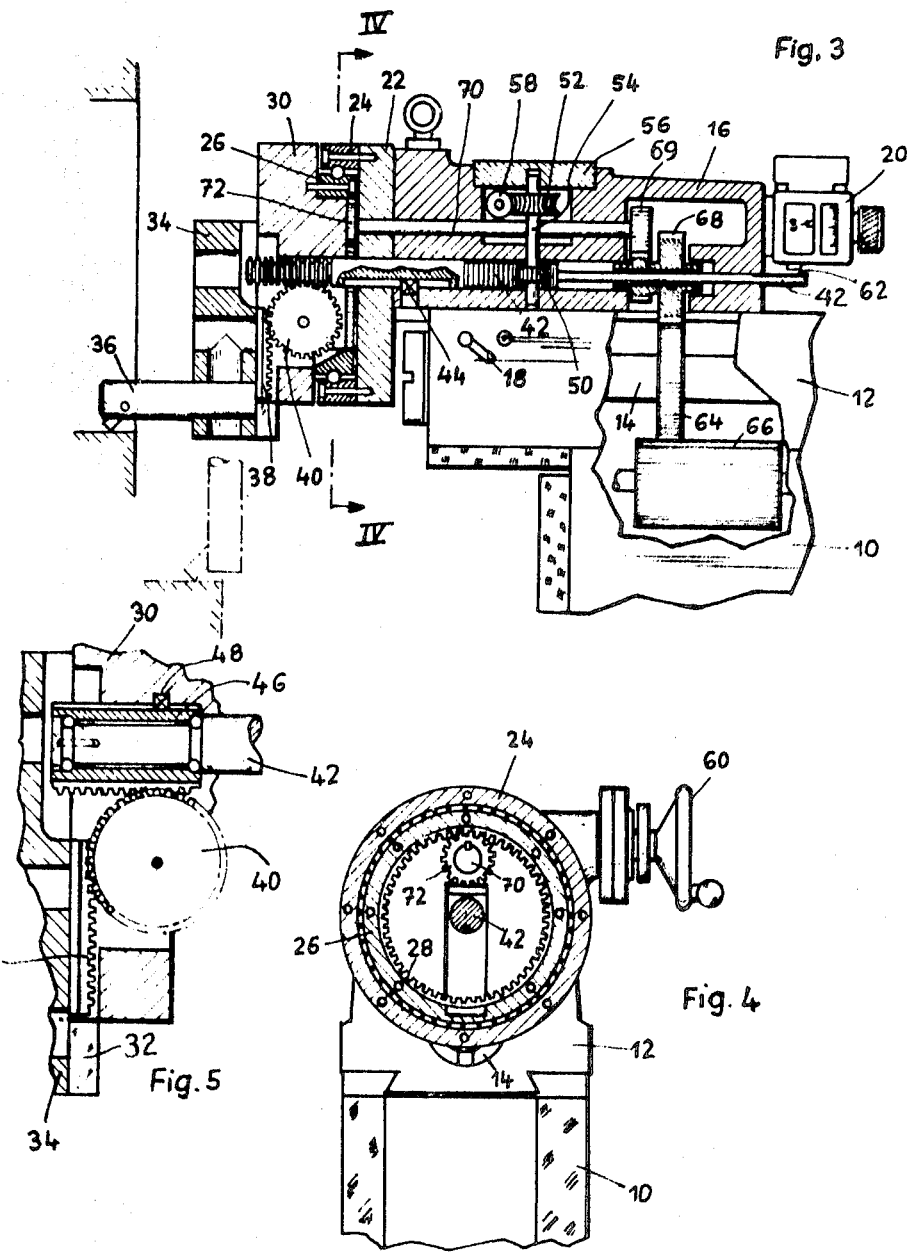

BORING AND FACING HEAD FOR MACHINE TOOLS

BACKGROUND OF THE INVENTION

Boring and facing heads for use with machine tools are well known in general. Broadly, it is known to use a tool slide radially adjustable on a slide carrier. In the past, it has been customary to adjust the radial position of the tool slide by mechanism so designed that it was necessary to stop the operation of the head in order to read the position of the tool slide by means of a scale or gauge or the like.

An object of the present invention is the provision of an improved and more satisfactory head, and particularly a head so designed that the adjusted radial position of the tool slide with respect to the axis of rotation of the carrier can be read while the head is in operation; in other words, without shutting down the operation of the boring and facing head, which can continue its operating rotation while the position of the tool slide is being read by a gauge or the like, and even while an adjustment to a new position is being made, to cause the tool to operate at a different radius from the axis of rotation of the carrier.

Another object is the provision of such mechanism so designed as to enable a particularly accurate and precise reading of the adjusted position of the tool slide. In one form of the invention, this accurate reading of the position is accomplished through the use of a linear scale marked on a longitudinally movable rod and read through an enlarging or magnifying glass. In another form of the invention, accurate determination of the adjusted position is accomplished by use of a dial gauge, or by the use of end gauges or gauge blocks.

A further object of the invention is the provision of such mechanism so designed that a plurality of gauging stops may be mounted on a turret and may be selectively brought into cooperative relation to a movable part, to assist in determining the location to which the tool slide is adjusted or is to be adjusted.

BRIEF DESCRIPTION OF THE DRAWINGS

In the accompanying drawings, incorporate herein by reference and constituting a material part of the disclosure and relating to an exemplary embodiment of the invention:

FIG. 3 is a view similar in general to FIG. 1, but with parts cut away and parts in vertical section, to show the interior construction;

FIG. 4 is a vertical section taken approximately on the line IV-IV of FIG. 3;

FIG. 5 is a view similar to a fragment of FIG. 3, on a larger scale, showing a modified form of connection between a gear and two racks;

DESCRIPTION OF THE PREFERRED EMBODIMENTS

Figure 1:
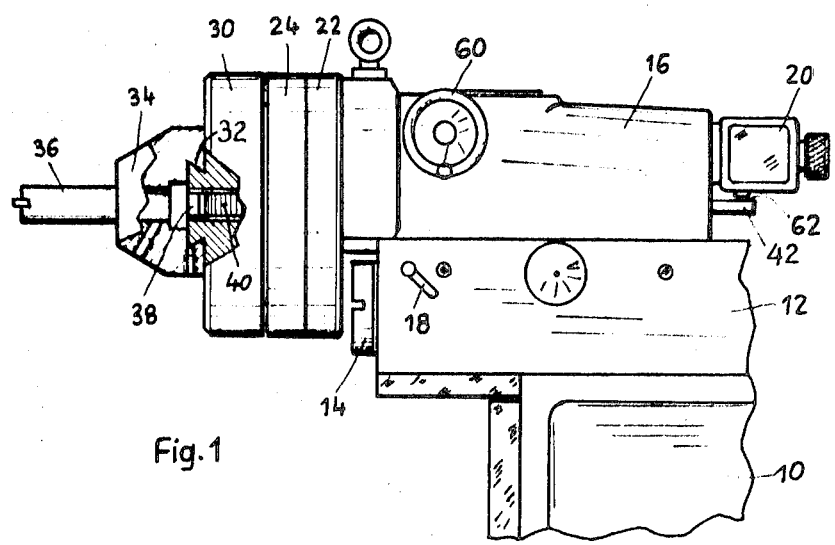
FIG. 1 is a side elevation of the upper part of a horizontal milling machine with an attached boring and facing head according to one embodiment of the present invention.

The conventional column or main housing of a milling machine is partially shown at 10, and supports a conventional spindle stock 12 containing a conventional horizontal spindle 14. A second spindle stock 16 is movable horizontally on guideways on the top of the spindle stock 12, and may be moved thereon horizontally (in a direction parallel to the rotary axis of the spindle 14) both manually and mechanically. It may be clamped in any desired position on the part 12 by conventional clamping means operated by a clamping lever 18.

On the rear end of the spindle stock 16 there is an enlargement lens assembly 20 such as is customarily used for the accurate reading of graduated scales on machine tools.

Mounted at the front end of the spindle stock 16 is a disklike plate 22 to which is fixed the outer ring or race 24 of a ball bearing. The corresponding inner ring or race 26 of the ball bearing has internal gear teeth 28 (see especially FIG. 4) and this inner race 26 is firmly fixed, as by a series of screws, to a slide carrier 30 which in this way is supported in easily rotatable manner on the spindle stock 13. Bearing balls or rollers are provided, of course, between the two bearing races 24 and 26.

On the front face of the rotatable slide carrier 30 there is a radial guideway 32, conveniently of undercut dovetail form as shown in FIG. 1. A tool slide 34 is guided for movement along this guideway 32, in a direction radially with respect to the axis of rotation of the slide carrier 30. The tool slide 34 has the conventional socket or sockets for receiving conventional machining tools such as, for instance, the boring bar shown at 36, or a conventional facing tool, or the like.

To the bottom or inner face of the tool slide 34, there is firmly fastened a gear rack 38 (FIG. 3) extending in a direction parallel to the direction of movement of the slide 34 along the guideway 32. The teeth of this rack mesh with the teeth of a gear 40 rotatably mounted in a recess in the slide carrier 30. The teeth of the gear 40 also engage with teeth on a bar 42 which is coaxial with the axis of rotation of the slide carrier 30 and is supported for axial displacement in the spindle stock 16. The bar 42 is held against rotation by a spline or other suitable known means. For example, a key 44 in the spindle stock 16 may engage a spline groove or keyway extending longitudinally in the bar 42. Since the gear 40 rotates bodily with the slide carrier 30 around the axis of the bar 42, the gear teeth on the bar 42 extend circumferentially all the way around the bar so that the teeth of the gear 40 remain meshed with the circumferential teeth on the bar 42 as the carrier 30 rotates, but without causing any turning of the gear 40 on its own axis.

As an alternative to this arrangement shown in FIG. 3, where the gear teeth on the bar 42 extend circumferentially around the bar, the modified arrangement shown in FIG. 5 may be used. Here, the teeth of the gear 40 mesh with longitudinal rack teeth on a sleeve 46 which is rotatably mounted on the bar 42 and held against axial displacement thereon. A key 48 on the slide carrier 30 engages a longitudinal groove in the sleeve 46 to prevent the sleeve from turning relative to the carrier 30, while permitting it to move longitudinally bodily with the bar 42. With this arrangement, as the carrier 30 rotates about its own axis (the axis of the ball bearing races 24 and 26) the gear 40 and the sleeve 46 rotate bodily with it, without causing any rotation of the gear 40 on its own axis.

In both of these alternative arrangements (FIG. 3 and FIG. 5) it is seen that so long as the bar 42 remains stationary, the tool slide 34 remains fixed in its radial position on the slide carrier 30 but rotates bodily with the slide carrier 30, thus causing the tool 36 to perform the desired machining operation. However, in both of these arrangements, if the bar 42 is moved longitudinally, this will turn the gear 40 on its own axis (regardless of the fact that it may at this time be rotating bodily with the slide carrier 30) and the rotation of the gear 40 on its own axis will, through the rack 38, cause readjustment or repositioning of the tool slide 34 to a new position radially with respect to the axis of rotation of the slide carrier 30. Thus by moving the bar 42 longitudinally or axially, the tool may be adjusted to a new radial position, while the boring head is operating as well as while it is shut down or stationary.

Figure 2:
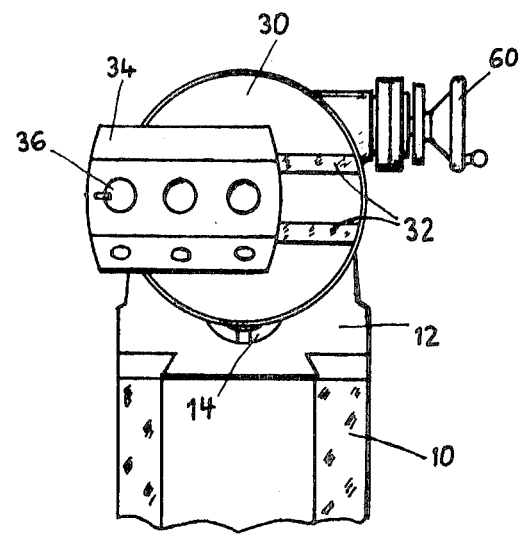
FIG. 2 is a front elevation of the parts shown in FIG. 1.

The desired longitudinal movement of the bar 42 may be imparted to it by providing rack teeth extending longitudinally along one side of the bar 42, engaged with the teeth of a pinion 50 which, together with a worm gear 52, is fixed to a shaft 54 journaled in the spindle stock 16 and in a removable cover plate 56 thereof. The worm gear 52 is engaged by a worm 58 on a shaft extending transversely with respect to the bar 42, the shaft 58 having an external handwheel or crank 60 as seen in FIGS. 1, 2, and 4. Thus by turning the handwheel or crank 60, the longitudinal position of the bar 42 and consequently the radial position of the tool may be adjusted at any time, while the machine is in operation or while it is stationary, and a very sensitive and precise adjustment is provided because of the use of the worm and worm wheel, and the use of the pinion 50 of relatively small size in comparison to the diameter of the worm wheel 52.

As best seen in FIG. 3, the bar 42 is prolonged rearwardly and extends out through the rear end of the spindle stock 16. The projecting rear end is provided with a linear scale 62 which can be read by means of the previously mentioned magnifying lens 20 mounted on the rear end of the spindle stock 16, to indicate the radial position of the tool carrier 34 at any given time, and to measure the extent to which it is moved during any particular adjusting operation. It will be observed from FIG. 3 that the rearwardly extending end of the bar 42 may, if desired, be of reduced cross sectional size as compared with the portion of the bar which extends forwardly from the gear 50 to the gear 40, since the rear part serves only for purposes of the measuring scale and does not have to transmit any operating forces.

The drive of the conventional horizontal spindle 14 is imparted to it in the conventional way by a gear 64 on the spindle 14 engaging with a toothed cylinder or wide face gear 66 which is sufficiently long in an axial direction so that the gear 64 will be engaged with the gear 66 in all positions to which the spindle stock 12 may be adjusted with respect to the column 10. The wide gear 66 is driven in conventional manner from a motor. To drive the rotary carrier 30 of the boring and facing head, the gear 64 of the spindle 14 meshes with a gear 68 journaled in the spindle stock 16 for rotation concentrically with the axis of rotation of the member 30 and the longitudinal axis of the bar 42. The gear 68 has a large central opening through which the scale portion of the bar 42 extends loosely. The gear 68 has a large diameter part meshing with the gear 64 as plainly shown in FIG. 3, and a smaller diameter part which meshes with a gear 69 on the rear end of a shaft 70 journaled in the spindle stock 16 in a position parallel to but offset radially from the axis of rotation of the member 30. The front end of this shaft 70 has fixed to it a gear 72 which engages the previously mentioned internal gear 28 on the bearing race 26 of the rotary carrier 30. The speed of rotation of the carrier 30, as well as the speed of rotation of the horizontal spindle 14, can be adjusted by means of the usual conventional change gearing (not shown) in the column 10. But because of the speed-reducing effect of the gear 68 plus further speed reduction by using the relatively small gear 72 meshing with the relatively large gear 28, the speed of rotation of the carrier 30 is considerably less than the speed of rotation of the horizontal spindle 14, at least in the ratio of 1 to 4 or even slower. Thus a sufficiently slow cutting speed can be set for the tool 36 even in the case of large turning diameters.

In addition to driving the adjusting bar 42 by the handwheel or crank 60, it is also possible to drive it mechanically by providing, in the spindle stock 16, a change speed gearing of a suitable conventional form, the input of which is connected to the shaft 70, and the output of which acts, through a clutch, on the shaft 54 or on the shaft of the handwheel 60, so that the radial position of the tool 36 may be fed mechanically while a facing operation progresses. During a boring operation, the tool may be fed mechanically in an axial direction by the usual conventional mechanical feed which moves the spindle stock 12 longitudinally on the column 10, the spindle stock 16 meanwhile remaining clamped in fixed position on the spindle stock 12 and moving bodily therewith.

Figure 6:
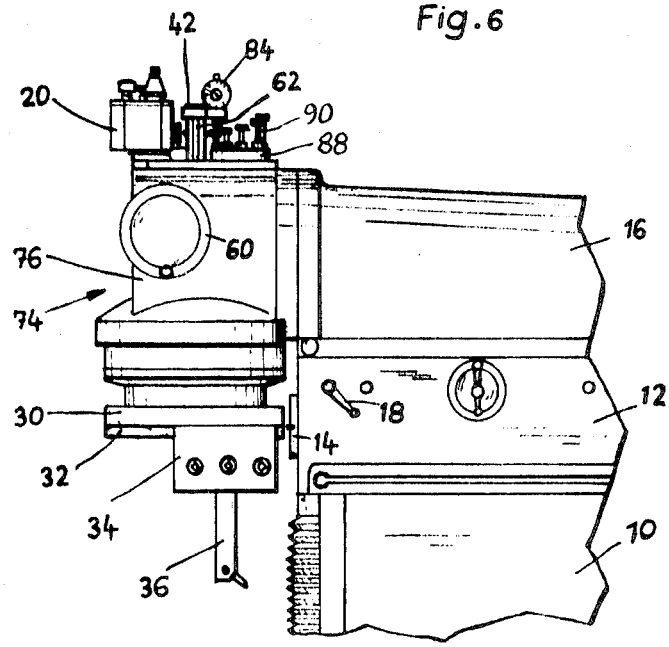
FIG. 6 is a side elevation similar in general to FIG. 1, but showing a modification in which the axis of rotation of the boring and facing head is vertical rather than being horizontal as in FIG. 1.
Figure 7:
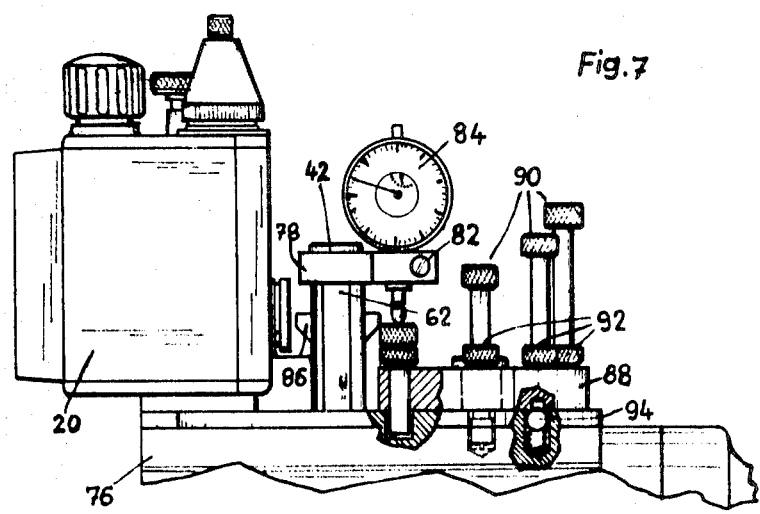
FIG. 7 is a view on a larger scale of the upper part of FIG. 6, showing additional details.
Figure 8:
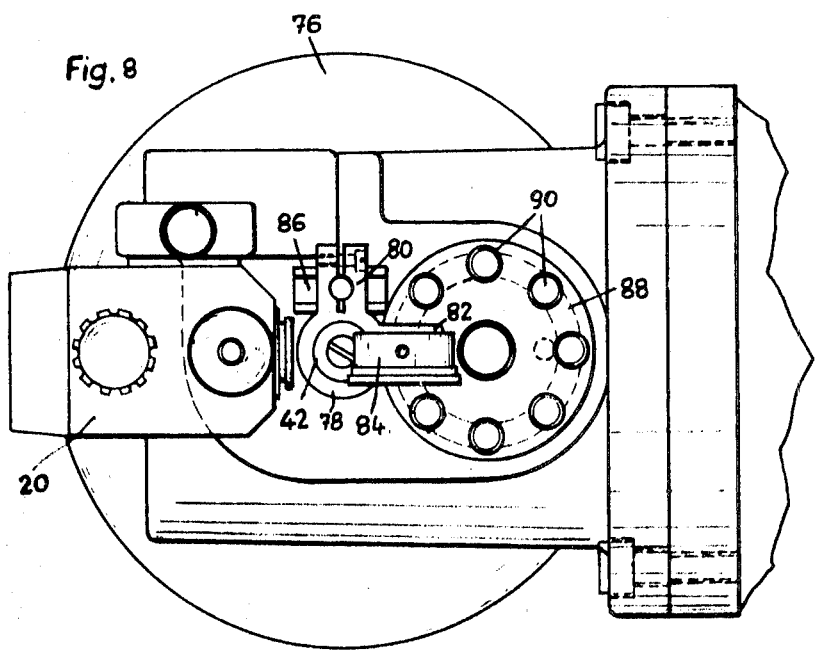
FIG. 8 is a plan of the parts shown in FIG. 7.

In the embodiment illustrated in FIGS. 6—8, the boring head indicated in general at 74 is mounted on the front end of the spindle stock 16. The mechanism within the housing 76 of the boring head 74 is essentially the same as previously described in connection with FIGS. 1—5 and the radial position of the tool slide 34 on the slide carrier 30 is adjusted in the same way as previously described, but the parts are differently oriented. In FIGS. 6—8, the slide carrier 30 rotates about a vertical axis, as distinguished from FIGS. 1—5 where it rotates about a horizontal axis. The rotary motion of the carrier 30 is driven, as before, from the spindle 14 within the spindle stock 12, conventional beveled gears or equivalent gears being used to obtain rotation about a vertical axis rather than a horizontal axis.

In this embodiment, the rotating slide carrier 30 is at the bottom of the housing 76, and the adjusting bar 42, extending along the axis of rotation of the carrier 30, projects out the opposite side of the housing, namely, out the top thereof. As before, longitudinal or axial movement of the bar 42 serves to adjust the radial position of the tool slide 34 along the dovetail guide 32 on the face of the rotating carrier 30. Also, as before, the projecting end of the rod 42, projecting above the top of the housing 76, is provided with the graduated linear scale 62 seen in FIGS. 6 and 7, which scale is read by the magnifying reading device 20 mounted on the top of the housing 76, and corresponding to the magnifying reading device 20 mounted on the rear end of the spindle stock 16 in the previously described construction. Also, just as in the previous construction, rotation of the handwheel 60 serves to adjust the bar 42 axially, thereby to adjust the tool slide 34 radially.

In this embodiment, a holder or bracket 78 (FIGS. 7 and 8) is fastened to the end of the rod 42. This bracket has two arms 80 and 82, at a right angle to each other. In each of these arms there is a borehole in which the mounting stem of a dial gauge 84 may be received and clamped fast.

When the dial gauge is mounted on the first arm 80, it overlies a small pedestal or shelf 86 secured to the top of the housing 76, and adapted to serve as a resting surface for an end gauge or gauge block.

Rotatably mounted on the top of the housing 76 is a turret 88, bearing a series of pins, preferably eight pins 90, all extending parallel to the axis of rotation of the turret 88 and parallel to the bar 42. These pins can be adjusted to various heights on the turret 88, and secured in adjusted position by lock nuts 92. They serve as fixed stops for the dial gauge 84 which is inserted in the opening in the arm 82 when it is desired to use the dial gauge with the stop pins 90 rather than with a gauge block resting on the pedestal 86. A spring-pressed detent ball 94, mounting in the housing 76, presses against the underface of the turret 88 and projects into a series of detent depressions in the underface of the turret, to hold the turret in one or another of the various rotary positions in which one or another of the gauge pins 90 is accurately placed beneath the gauging stem of the dial gauge 84 when the latter is mounted in the arm 82.

With this arrangement, it is possible to adjust the radial position of the boring tool 36 by means of the dial gauge 84 in a very convenient manner, to give values or adjusted positions which are determined by one or another of the fixed stop pins 90, or by one or another of a series of gauge blocks which may be selectively placed on the pedestal 86. Of course the same arrangement can be mounted on the rear end of the spindle stock 16, for gauging the longitudinal adjustment position of the bar 42 when this bar extends horizontally through the spindle stock 16 as in the arrangement described in connection with FIGS. 1—5, instead of extending vertically as in FIGS. 6—8.

It is to be understood that the disclosure is given by way of illustrative example only, rather than by way of limitation.

What I claim is:

1. A boring and facing head comprising a housing, a slide carrier mounted on said housing for rotation about an axis of rotation, a tool slide mounted on and rotating bodily with said carrier and adjustable on said carrier in a direction radially of said axis of rotation, a feed element coaxial with said axis of rotation and displaceable in the direction of said axis, operating means operatively connecting said feed element to said tool slide to move said tool slide radially from axial movement of said feed element, characterized by an extension on said feed element extending to a position externally of said housing, and a graduated scale on the external portion of said extension.

2. A construction as defined in claim 1, further comprising a scale reading mark including an enlargement lens for reading said scale.

3. A construction as defined in claim 1, wherein said feed element is a bar fixed against rotation, and further comprising means including a rotatable shaft parallel to and spaced radially from said bar for rotating said slide carrier.

4. A construction as defined in claim 3, wherein said means for rotating said slide carrier includes an internal gear fixed to said slide carrier coaxially with the axis of rotation thereof and a gear on said rotatable shaft meshing with said internal gear.

5. A construction as defined in claim 1, wherein said operating means comprises a first toothed rack extending axially on said feed element, a second toothed rack extending radially on said tool slide, and an operating gear mounted in and rotating bodily with said carrier and engaging both said first toothed rack and said second toothed rack.

6. A construction as defined in claim 5, wherein said first toothed rack is formed on a sleeve mounted for rotation on said feed element and held against axial movement with respect to said feed element.

7. A construction as defined in claim 1, further comprising a dial gauge holder mounted on said external extension of said feed element.

8. A construction as defined in claim 7, further comprising means externally of said housing for holding a gauge block in position to cooperate with a dial gauge mounted in said gauge holder.

9. A construction as defined in claim 7, further comprising means for holding at least one adjustable stop in position to cooperate with a dial gauge mounted in said gauge holder.

10. A construction as defined in claim 7, further comprising a rotatable turret mounted on said housing and carrying a plurality of adjustable stops, any selected one of which may be brought into position to cooperate with a dial gauge mounted on said gauge holder.